July 14, 1964
C. M. WALBY
3,140,627
LATHE TOOL AND HOLDER THEREFOR
Filed Dec. 26, 1961
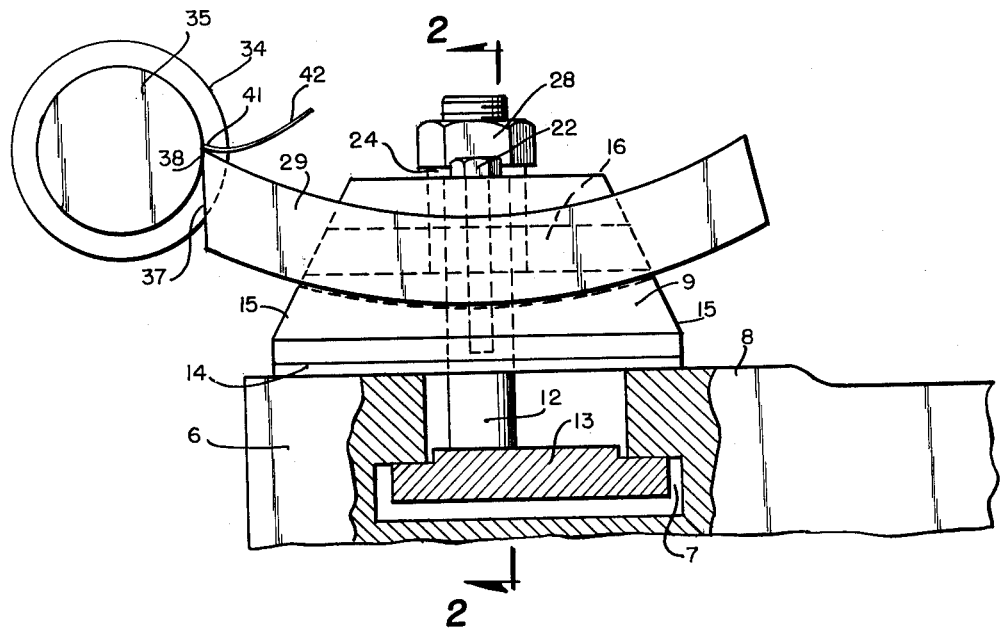
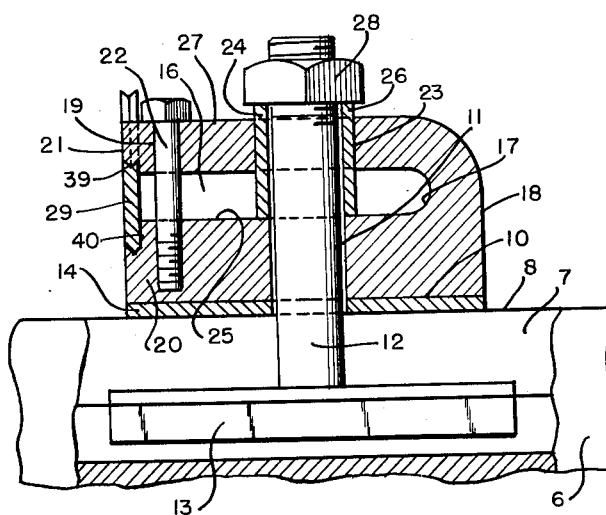
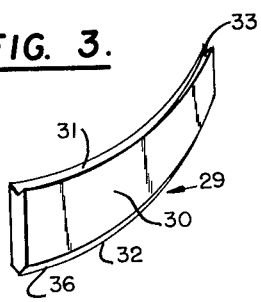
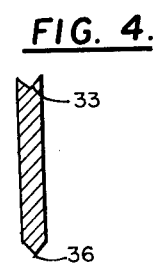
INVENTOR
Casper M. Walby

United States Patent Office 3,140,627
Patented July 14, 1964

3,140,627
LATHE TOOL AND HOLDER THEREFOR
Casper M. Walby, Rte. 3, Box 108, Tracy, Calif.
Filed Dec. 26, 1961, Ser. No. 162,136
2 Claims. (Cl. 82—37)

This invention relates generally to machine tools, and more specifically to a tool and holder for accomplishing the operation cut-off on a lathe.

The straight radial cut used when cutting off work mounted in a lathe is considered one of the most difficult operations from a tooling standpoint. The main problem experienced is due to chatter which causes damage to lathe bearings, the work, and the tool itself. My invention is directed towards the provision of an improved tool design and support therefor which overcomes the property of chatter as a result of specific design features to be related forthwith.

It is therefore a primary object of this invention to provide a lathe tool for cut-off purposes which is arcuate in shape, thereby enabling the tool to be properly centered throughout the tool life without resort to the use of shims and other means of elevating the point of the tool bit relaive o the lathe centers.

It is a further object of this invention to provide an arcuate tool bit which is formed with a concave groove at the cutting edge to enable a proper rake angle to be exposed to the side faces of the work during a cut-off operation.

It is a still further object of this invention to provide an arcuate lathe tool in conjunction with a tool holder of novel construction which permits a firm hold on the tool and is mounted directly on the compound rest of the lathe.

A full understanding of the construction of this invention, together with further novel features and advantages, will become apparent from the following detailed description of a preferred embodiment thereof, taken in conjunction with the attached drawings wherein:

FIG. 1 is a side elevation shown partly in cross section of the lathe tool and holder of my invention positioned for cutting a cylindrical work piece.

FIG. 2 is a cross sectional rear elevation taken along the line 2—2 of FIG. 1.

FIG. 3 is a perspective view of a preferred form of cut-off tool for cooperation with the holder of my invention.

FIG. 4 is a cross sectional view of a tool shown in FIG. 3.

FIG. 5 is a cross sectional view of a slightly modified tool bit having a similar arcuate design to that shown in FIG. 3.

Similar reference characters indicate corresponding parts throughout the several views in the drawings.

Referring now to the drawings in detail, the numeral 6 represents the compound rest of a lathe having a conventional T slot 7 formed transversely across the platform face 8 of the rest. A tool holder 9 has a flat base 10 for engagement with platform face 8 and has a vertical bore 11 formed therethrough to receive a clamping stud 12 therethrough, the said stud being anchored in a plate 13 disposed within the T slot 7. A spacer plate 14 may be disposed between the base 10 and the platform face 8 if so desired.

The tool holder is provided with upwardly tapering sides 15 and is formed with a horizontally extending slot 16 extending between the said sides and terminating at 17 inwardly spaced from a vertical side face 18. The slot thus forms two vertically spaced jaws 19 and 20 on the side 21 opposite the vertical side face 18. The jaws are clampingly closed one towards the other by a bolt 22 which extends vertically through a forward portion of the jaw 19 and threadably engages in the lower jaw 20 as seen best in FIG. 2 of the drawing. A bore 23 formed concentrically above the bore 11 through the upper jaw 19 received a sleeve 24 therethrough, the said sleeve engaging against the lower face 25 of the slot and projecting through the bore to terminate at 26 proud of the upper face 27 of the jaw 19. A nut 28 is engaged on the clamping stud 12 and secures the tool holder to the compound rest by tightening down the sleeve 24 against the lower jaw 20. It will thus be seen that the upper jaw 19 is given some degree of movement relative to the lower jaw after the holder is secured firmly in position on the rest.

The cutting tool 29 is formed of flat stock and has opposed parallel side faces 30, an upper concave edge 31, and a lower convex edge 32 formed parallel with each other. A V groove 33 extends along the upper edge 31 so as to provide rake to the side faces 34 of a piece of bar stock 35 which is being cut off by the tool. The lower edge 32 is tapered to a central point 36 to aid in accurately locating the tool in the tool holder. A front rake 37 is formed at the correct angle so as to provide a cutting edge 38 at the forward end of the tool.

The two jaws 19 and 20 are machined with arcuately formed recesses 39 and 40 which accurately locate with the upper and lower edges 31 and 32 of the tool, the said grooves performing to hold the tool in a rigid vertical plane. It will be appreciated that the tool may be moved longitudinally within the recesses 39 and 40 so as to permit accurate adjustment of the cutting edge 38 with respect to the work piece, the said edge engaging the work piece at 41 and forming a continuous chip 42 which constitutes metal being removed.

A slight modification of tool bit is shown in FIG. 5 of the drawing. In this instance the upper edge 43 is formed with a concave section 44 and the side faces 45 are provided with negative side rake 46 which will operate to further eliminate possible causes of tool chatter.

It will be appreciated that the jaws 19 and 20 may be suitably recessed to receive straight shanked tools for conventional cutting operations.

From the foregoing, it is believed that the construction, operation and advantages of this invention will be fully apparent. However, since numerous modifications will occur to those skilled in the art, it is not desired to limit the construction exactly to that shown and described, the scope of the invention being defined in the following claims.

I claim:
1. A lathe tool in combination with a tool holder for mounting on the compound rest of a lathe, and comprising, a holder block, a horizontally extending slot formed in the block to form two vertically spaced jaws, a clamping stud extending vertically through the block and adapted for clamping the lower of said jaws to the compound rest, a clamping stud for selectively closing the jaws towards each other, said jaws having arcuate recesses formed therein, a tool bit having arcuate and parallel upper and lower edges, parallel side faces, a groove in its upper edge and a tapered lower edge, for engagement by said jaws and extending therebeyond in a upwardly extending arc to terminate with a cutting point adapted for a cut-off operation.

2. A lathe tool in combination with a tool holder for mounting on the compound rest of a lathe, and comprising a holder block, a horizontally extending slot formed in the block to form two vertically spaced jaws, a clamping stud extending vertically through the block and adapted for clamping the lower of said jaws to the compound rest, a clamping stud selectively closing the jaws towards each other, said jaws having arcuate recesses formed therein, a tool bit having arcuate and parallel upper and lower edges, a concave groove extending along its upper edge, and side faces tapered downwardly towards its lower edge, for engagement by said jaws and extending therebeyond in a upwardly extending arc to terminate with a cutting point adapted for a cut-off operation.

References Cited in the file of this patent

UNITED STATES PATENTS

| | | |
|---|---|---|
| 1,649,553 | Stafford | Nov. 15, 1927 |
| 2,149,038 | Anthony | Feb. 28, 1939 |
| 2,540,568 | Clatfelter | Feb. 6, 1951 |
| 2,688,791 | Luers et al. | Sept. 14, 1954 |

FOREIGN PATENTS

| | | |
|---|---|---|
| 247,958 | Great Britain | Aug. 12, 1926 |
| 836,135 | France | Oct. 10, 1938 |
| 747,608 | Germany | Dec. 8, 1952 |